United States Patent [19]
Cicchetti

[11] Patent Number: 5,768,981
[45] Date of Patent: Jun. 23, 1998

[54] STERILIZABLE STEAM HEATING DEVICE

[75] Inventor: Pietro Cicchetti, Cesano Maderno, Italy

[73] Assignee: Quick Italia S.r.l., Cesano Maderno, Italy

[21] Appl. No.: 834,388

[22] Filed: Apr. 16, 1997

[30] Foreign Application Priority Data

Apr. 17, 1996 [IT] Italy ............................. MI9600296 U

[51] Int. Cl.⁶ ............................. A47J 31/40; A47J 31/46; A23C 9/00; A23L 2/26
[52] U.S. Cl. ............................. 99/453; 99/275; 99/293; 99/452; 99/323.1
[58] Field of Search ...................... 99/452–454, 275–279, 99/323.1–323.3, 281–286, 289 R, 291, 293–295, 300, 302 R; 261/78.1, DIG. 16, DIG. 76, 124, 142; 426/477

[56] References Cited

U.S. PATENT DOCUMENTS

| | | |
|---|---|---|
| 4,043,019 | 8/1977 | Chervenak et al. . |
| 4,374,798 | 2/1983 | Mercer . |
| 4,585,357 | 4/1986 | Ogata ..................................... 99/452 X |
| 4,715,274 | 12/1987 | Paoletti ..................................... 99/454 |
| 4,735,133 | 4/1988 | Paoletti ..................................... 99/454 |
| 4,800,805 | 1/1989 | Mahlich et al. ........................... 99/293 |
| 4,852,473 | 8/1989 | Bolivar ..................................... 99/293 |
| 4,922,810 | 5/1990 | Siccardi ................................. 99/323.1 |
| 4,949,631 | 8/1990 | Fregnan ..................................... 99/452 |
| 5,052,289 | 10/1991 | Di Girolamo ............................. 99/452 |
| 5,096,335 | 3/1992 | Anderson et al. . |
| 5,154,112 | 10/1992 | Wettern ................................. 99/323.1 |
| 5,199,825 | 4/1993 | Travis . |
| 5,236,499 | 8/1993 | Chervenak et al. . |
| 5,277,520 | 1/1994 | Travis . |
| 5,295,431 | 3/1994 | Schiettecatte et al. .................... 99/293 |
| 5,335,588 | 8/1994 | Mahlich ................................... 99/293 |
| 5,423,245 | 6/1995 | Midden ................................... 99/275 |
| 5,464,574 | 11/1995 | Mahlich ................................. 261/124 |

*Primary Examiner*—Timothy F. Simone
*Attorney, Agent, or Firm*—Jacobson, Price, Holman & Stern, PLLC

[57] ABSTRACT

A device (10) for producing a heated milk-air emulsion comprises, at the inside thereof, circulation paths for steam, milk and air towards a delivery outlet (11). A blocking means (20) is drivingly slidable to close the delivery outlet (11) and thereby enable execution of an inner-cleaning cycle in the device on activation of steam circulation. Advantageously, the delivery outlet (11) is formed of a duct (25) the free end (26) of which is of tapered shape. Axially disposed inside duct (25) is a dispenser (27) at which the circulation paths arrive and which has radial passageways (28) opening into the duct (25). For accomplishment of the blocking means, the duct and dispenser are axially slidable relative to each other to bring the dispenser (27) to a sealing contact position against the duct (25) thereby closing passage of same to the the outside.

8 Claims, 1 Drawing Sheet

STERILIZABLE STEAM HEATING DEVICE

FIELD OF THE INVENTION

The present invention relates to an steam heating and/or emulsifier device for milk (like as a "cappuccino-making" device) or other beverages.

BACKGROUND OF THE INVENTION

A problem arises in such devices in that cleaning operations are of difficult accomplishment. Actually, the small inner ducts, often inaccessible, can easily become a breeding-ground for moulds and bacteria, or in any case can house deposits that are to be eliminated. It has been proposed that the same steam used for heating and/or generating the heated emulsion should be also employed for cleaning and sterilizing all the device ducts at high temperature. In the devices of the known art however, operations to be executed for steam-cleaning and sterilization are relatively complicated and can cause faults.

The general object of the present invention is to obviate the drawbacks of the known art by providing a steam heating device which enables an easy and safe steam-cleaning.

SUMMARY OF THE INVENTION

In view of the above object, in accordance with the invention, a steam heating device for producing a heated (beverage) has been conceived which is provided at the inside thereof with paths enabling steam and beverage, to circulate to a delivery outlet, characterized in that it comprises drivingly slidable blocking members for closing the delivery outlet, so that an inner-cleaning cycle may be performed on operation of the steam circulation.

BRIEF DESCRIPTION OF THE DRAWINGS

For better explaining the innovatory principles of the present invention and the advantages it offers over the known art, a possible embodiment of same applying said innovatory principles will be disclosed hereinafter, by way of non-limiting example, with the aid of the accompanying drawings. In the drawings.

DETAILED DESCRIPTION OF THE PREFERRED EMBODIMENTS

Figure 1:
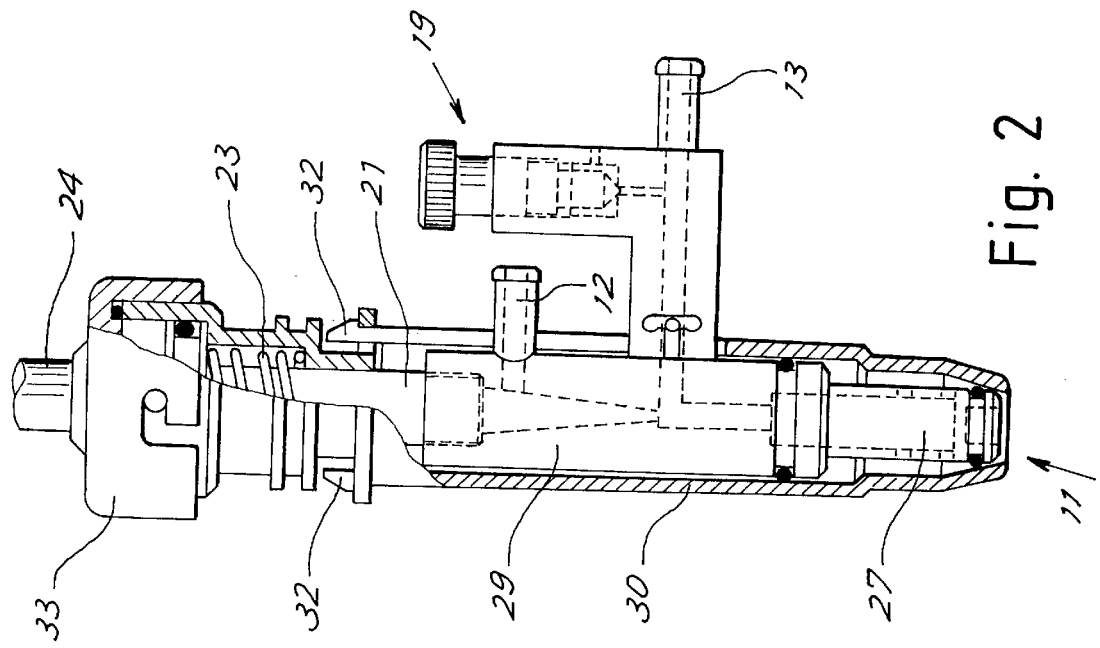
FIG. 1 is a longitudinal sectional view of a device in accordance with the invention, at a first position of normal operation.

With reference to the drawings, a steam heating device 10, that is a device for producing a heated beverage or a milk-air emulsion, is internally comprised of circulation and mixing paths for steam, beverage and, if required, air to a delivery outlet 11.

The device 10 comprises a steam-flow inlet 12, a beverage-admission inlet 13 and an air inlet 14. For example, the beverage is milk. The circulation paths comprise an axial chamber 15 into which steam from inlet 12 is introduced. Chamber 15 tapers for opening into a chamber 16 of greater diameter at the radial arrival point of a duct 17 connected to the milk inlet 13. In this way, the steam flow entering the chamber of greater diameter 16 sucks the milk from the milk-supply duct. Radially opening into the milk-supply duct 17 is a duct 18 for air admission from inlet 14. On passage of the milk flow along duct 17, air is drawn in from duct 18. In this manner air is emulsified with milk. A needle valve 19 is located along the air duct for regulating the amount of sucked air in the milk-supply duct.

A substantially known art has been hitherto described. In accordance with the invention, the device 10 comprises blocking means 20 that is drivingly slidable for closing the delivery outlet 11. The blocking means is controlled by an actuator 21. Actuator 21 can be of a mechanical, electric, pneumatic, etc. type. For example, it could consist either of a mere pushbutton to be operated manually, or of a plunger 22 that, against the action of a spring 23, moves the blocking means. Advantageously, the plunger can be operated by a steam flow reaching the device through a duct 24.

Advantageously, the delivery outlet 11 is made up of a duct 25 the free end 26 of which is of tapered conformation. Axially disposed within duct 25 is a dispenser 27 to which the circulation passageways through chamber 16 come. Dispenser 27 has radial passageways 28 opening into duct 25.

Figure 2:
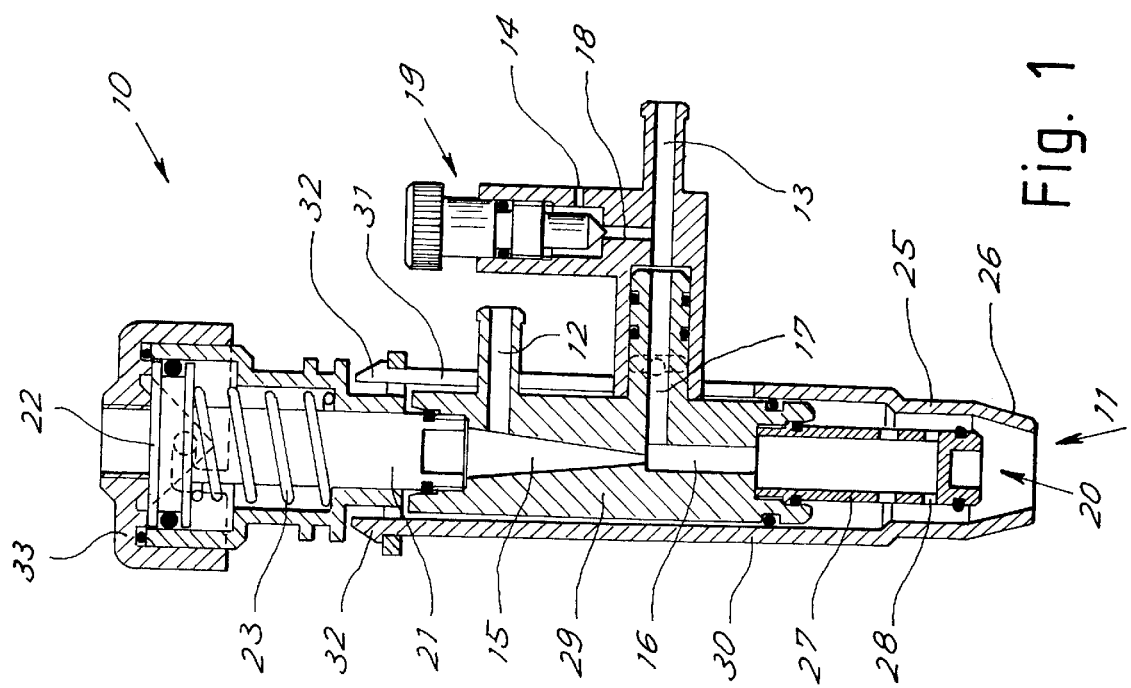
FIG. 2 is a partly sectioned longitudinal view of the device in FIG. 1, at a second position for cleaning.

As shown in FIG. 1, when the device is in a normal operating condition, an annular passageway is defined between the duct 25 and dispenser 27 for drivingly emitting the emulsion from outlet 11. As shown in FIG. 2, duct 25 and dispenser 27 are axially slidable relative to each other so that, on the actuator operation, the dispenser is biased into sealing contact against the inner tapered portion 26 of the duct, thereby closing passage to the outside and embodying the outlet blocking means.

Advantageously, the dispenser moves integrally with a body 29 of the device inside which the circulation passageways are formed, whereas the tapered duct 25 extends rearwardly to form a chamber or sliding casing 30 slidably receiving an axial portion of said body. Ducts 12 and 13 and the valve unit 19 project from the casing 30 through a side slit 31. The actuator body is snap-fastened to the casing 30 by means of locking tabs 32.

Still advantageously, the valve unit 19 together with the starting portion of duct 17, can be bayonet-disconnected from body 29, in addition to partly rotating about the axis of duct 17.

At this point it is apparent that the intended purposes have been achieved. In normal operating conditions, the device is as shown in FIG. 1, so that it is sufficient to send steam to inlet 12 to enable the heated emulsion to come out of the outlet 11, as in the known art. When an inner-cleaning cycle is desired, operation of the actuator is sufficient, in order that the blocking means may close the outlet 11 as shown in FIG. 2. By sending steam to inlet 12, a steam circulation occurs that moves up along the ducts located inside the device and sterilizes them.

In any case, as clearly viewed from the figures, the described device can be easily disassembled should a thorough cleaning be required. Actually, removal of the upper bayonet-fastened plug 33 is sufficient to enable the whole inner set to be taken out, which set can be further dismantled into its individual components. Obviously, the above description of an embodiment applying the innovatory principles of the present invention is for purposes of illustration only and is not to be interpreted as a limitation of the scope of the invention as herein claimed.

For example the shape of the inner device ducts can be different from that herein shown.

The needle valve can be omitted or completely closed. In this manner, the device became a steam heating device without emulsifier. The heating device can be used for heating milk, coffee, chocolate, etc.

What is claimed is:

1. A steam heating device for producing a heated beverage, said steam heating device comprising:

internal circulation paths for steam and beverage to circulate towards a delivery outlet, and drivingly slidable blocking means for closing the delivery outlet, so that an inner-cleaning cycle may be performed on operation of steam circulation.

2. A device according to claim 1, wherein the delivery outlet consists of a duct a free end of which is of tapered shape, and inside of said duct a dispenser being axially disposed at which said circulation paths arrive and which is provided with radial passageways opening into the duct, which dispenser and duct are axially slidable relative to each other, so as to bring the dispenser to a sealing contact position against the duct and to close passage of same to the external environment, thus embodying said outlet blocking means.

3. A device according to claim 1, wherein the dispenser is slidably moved to a contact position with the duct, against action of a spring, by means of an actuator coaxial with the dispenser.

4. A device according to claim 1, wherein the dispenser moves integrally with a body of the device inside which said circulation paths are located.

5. A device according to claim 4, wherein the tapered duct extends rearwardly to slidably receive an axial portion of said body.

6. A device according to claim 1, wherein the circulation paths are comprised of a steam-receiving axial chamber which tapers for opening into a chamber of greater diameter at a radial arrival point of a duct for beverage supply, steam flow entering the chamber of greater diameter and sucking beverage from the beverage-supply duct, a duct for air admission radially opening into the beverage-supply duct for emulsifying the beverage.

7. A device according to claim 6, wherein the air-admission duct is provided with a needle valve for regulating the air amount drawn into the beverage-supply duct.

8. A device according to claim 3, wherein the actuator is embodied by a plunger operated by a steam flow.

* * * * *